W. D. Shaw,
Making Shoe Pegs.
Nº 23,614.    Patented Apr. 12, 1859.
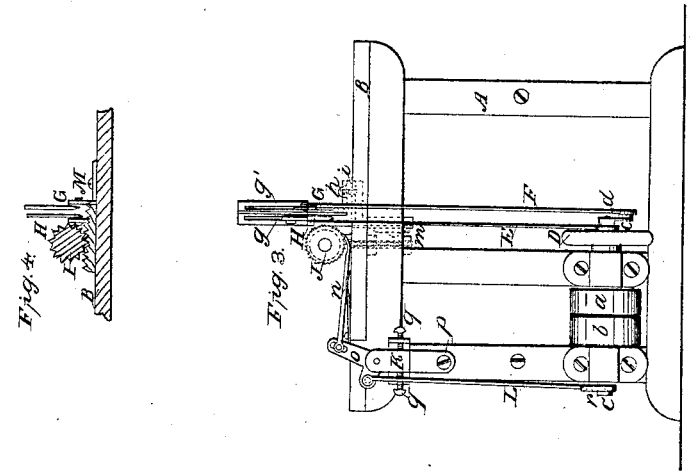
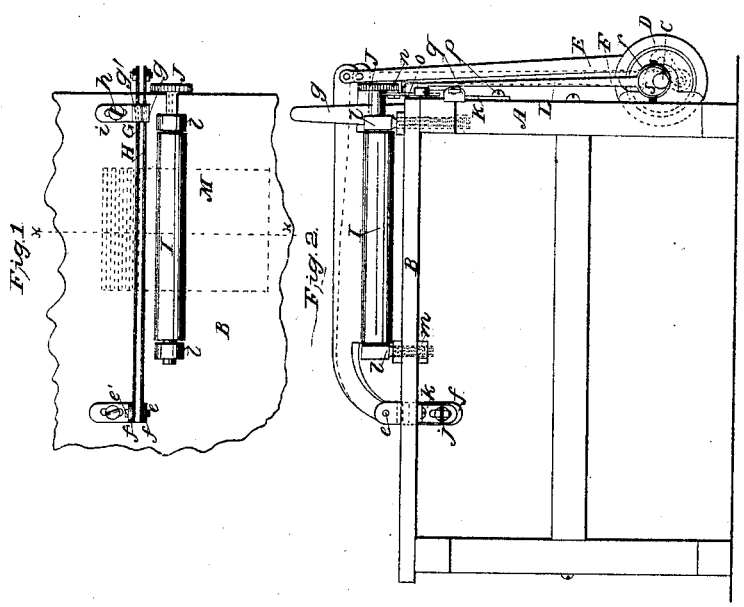
Witnesses:
Edwin Bernick
Enoch Bemick
Inventor:
Winthrop D. Shaw

UNITED STATES PATENT OFFICE.

WINTHROP D. SHAW, OF TAMWORTH, NEW HAMPSHIRE.

MACHINE FOR SPLITTING SHOE-PEGS FROM THE BLOCK.

Specification of Letters Patent No. 23,614, dated April 12, 1859.

*To all whom it may concern:*

Be it known that I, W. D. SHAW, of Tamworth, in the county of Carroll and State of New Hampshire, have invented a new and Improved Machine for Cutting Shoe-Pegs; and I do hereby declare that the following is a full, clear, and exact description of the same, reference being had to the annexed drawings, making a part of this specification, in which—

Figure 1, is a plan or top view of my invention. Fig. 2 is a side elevation of do. Fig. 3, is an end elevation of do. Fig. 4, is a transverse vertical section of the feed rollers and knives, $x$, $x$, Fig. 1, indicating the plane of section.

Similar letters of reference indicate corresponding parts in the several figures.

This invention relates to an improvement in that class of shoe peg machines in which a feed roller and a single knife are employed for performing the desired work.

The object of the within described invention is to expedite the working of this class of machines without augmenting the labor or number of attendants required in operating the old machines.

The invention consists in the employment or use of two knives, arranged and applied to the machine so that they will work conjointly with a feed roller and effect the desired result.

To enable others skilled in the art to make and use my invention, I will proceed to describe it.

A, represents a suitable framing on which a platform B, is placed and permanently secured. To the lower part of the framing A, at one side, a driving shaft C, is secured, said shaft having a working pulley $a$, and a loose pulley $b$, placed upon it. To the inner end of the shaft C, a crank wheel D, is attached and to this crank wheel two pitmen E, F, are secured, the pitman E, being attached directly to the wheel near its periphery, and the pitman F, attached to a supplemental crank $c$, which is attached to the crank wheel by the same pin $d$, that connects the pitman E, to it, see Fig. 3, and dotted lines in Fig. 2.

The upper ends of the pitmen E, F, are connected to knives G, H, which at their back ends are fitted on pivots or pins $e$, $e'$, which pass through adjustable bars $f$, $f'$ in the platform B. The front part of the knives work in guides $g$, $g'$, one of which, $g$, is stationary, the other, $g'$, being rendered capable of a lateral adjustment in consequence of a set screw $h$, passing through a slotted base plate $i$, into the platform B, see Fig. 1. The bar $f'$, is allowed a lateral adjustment on account of its attachment to bar $f$, by a screw $h'$, and the bar $f$, passes vertically through the platform B, and is allowed to be adjusted vertically by means of a set screw $j$, which passes through a slotted plate $k$, at the under side of the platform, and into the bar $f$, (see Fig. 2).

On the platform B, a fluted roller I, is placed, the bearings $l$, $l$, of which are allowed to be adjusted vertically by means of nuts $m$. This roller is placed parallel with the knives G, H, and a ratchet J, is placed on its outer end, said ratchet having a number of teeth equal to the number of grooves in the roller I, or just half the number of teeth will answer. Into the ratchet J, a pawl $n$, catches. This pawl is attached to a bell crank $o$, which is pivoted in an adjustable bar K, attached at its lower end to the framing A, by a pivot $p$, and secured at its upper part between set screws $q$, $q$. The lower arm of the bell crank $o$, is attached to a rod L, the lower end of which has a strap $r$, on it which encompasses an eccentric $s$, on the driving shaft C.

The operation is as follows. The block M, from which the pegs are cut is got out of the proper thickness and its upper surface is grooved by any suitable tool or machine, in two directions, so that the grooves will cross each other at right angles, forming a series of points. The block M, is placed beneath the roller I, the fluted projections of the same fitting in the grooves of the block, the grooves in the block and the fluted projections on the roller corresponding with each other so that the former may gear into the latter. The roller I, feeds the block underneath the knives G, H, which as they descend, one a trifle in advance of the other, cut each a strip from the block without entirely severing it therefrom, the lower part being allowed to adhere in consequence of the shortness of the stroke of the knives. The knives descend into the grooves in the block, and the block M, is fed forward during the upward movement of the knives, a distance equal to two grooves in the block. The pawl $n$, therefore must be operated with a view to this end. When the block M, is cut or split in one direction, its position is reversed and it is cut or split at right angles to the previous cuts and the pegs are thereby formed, the grooving of the block serving to point the pegs, as well as causing it to be evenly fed to the knives.

Pegs of different sizes and lengths may be cut by adjusting the feed roller I, to suit the thickness of the bolt, and the space between the knives G, H, may be regulated by adjusting the knife G, by relaxing the screws $h, h'$. The knives may also be adjusted vertically by adjusting the bar $f$, and the pawl $n$, may be adjusted to operate on the ratchet J, as may be desired by regulating the set screws $q, q$.

By means of this invention the operation of cutting shoe pegs is greatly expedited, in fact just double the work may be done in a given time that can be done with the usual single knife machine, and the work may be done equally as well.

I do not claim a reciprocating knife in connection with a fluted feed roller, for cutting shoe pegs, for such device has been previously used, neither do I claim simply duplicating a reciprocating knife, or the employment of two reciprocating knives in connection with a feed roller irrespective of the arrangement herein shown and described.

I claim therefore as new and desire to secure by Letters Patent,

The feed roller I, in connection with the two reciprocating or vibrating knives G, H, the latter being so operated that one will move slightly in advance of the other, so that the cuts will be given the block successively and still admit of the proper feeding of the block M, to the knives, the feed roller being operated by the pawl $n$, rendered adjustable by the attachment of the bent lever $o$, to the adjustable bar K, the whole being combined and operating substantially as and for the purpose set forth.

WINTHROP D. SHAW.

Witnesses:
  EDWIN REMICK,
  ENOCH REMICK.